April 21, 1959 E. O. KEIZER 2,883,451
COLOR TELEVISION RECEIVERS
Filed Jan. 7, 1955 2 Sheets-Sheet 1

INVENTOR.
EUGENE O. KEIZER
BY [signature]
ATTORNEY

INVENTOR.
EUGENE O. KEIZER
BY [signature]
ATTORNEY

United States Patent Office
2,883,451
Patented Apr. 21, 1959

2,883,451

COLOR TELEVISION RECEIVERS

Eugene O. Keizer, Princeton, N.J., assignor to Radio Corporation of America, a corporation of Delaware Application January 7, 1955, Serial No. 480,434
5 Claims. (Cl. 178—5.4)

The present invention relates to improved color television image reproduction apparatus and, more particularly, to apparatus for improved tracking of a scanning electron beam in a cathode ray tube of the so-called line screen variety.

Among the various proposals which have been made regarding color television image reproducing tubes, one provides for the scansion, by an electron beam, of a luminescent target screen made up of a plurality of groups of horizontally disposed strip-like elements of respectively different component color light-emitting characteristics in an undulatory or "wobble" fashion. That is, an electron beam is caused to wobble with a vertically directed excursion as it scans in a direction nominally parallel to the strip-like elements. The electron beam is also modulated in current intensity by video signals successively representative of the component colors of an image to be reproduced and in synchronism with the wobble of the beam so that the modification of the current intensity of the beam at any instant corresponds to the intensity of that color represented by the particular strip-like element upon which it is impinging. Such an arrangement, as will be appreciated, requires accurate positioning or tracking of the electron beam with respect to the screen elements at all times in order for proper color rendition to be realized. The importance of accurate tracking in a color kinescope of the type in question is further apparent from the fact that individual strip-like color elements on the face of the tube may be as narrow as 0.015 inch, or less with the electron beam diameter of comparable size.

Other types of color television image reproducing tubes which have a luminescent target screen made up of a plurality of groups of horizontally disposed strip-like elements of respectively different component color light emission characteristics, utilize a plurality of scanning electron beams; one of said plurality of scanning electron beams is utilized to excite a horizontally disposed strip-like element of a particular component color light emitting characteristic for an entire scanning line in a manner whereby color light is emitted from that element according to the video signal representative of that component color light. One or more of the pluralities of scanning electron beams may also provide the aforementioned scansion in undulatory or wobble fashion to develop registration indicative signals which provide for accurate positioning or tracking of all of the pluralities of scanning electron beams with respect to the screen element at all positions along each scanned line.

It is an object of this invention to provide improved apparatus for affording tracking control of one or more scanning electron beams in a color image reproducer of the horizontal line screen variety.

It is another object of this invention to provide an improved means for control of the scanning path of a vertically wobble scanning electron beam in a horizontal strip-type color kinescope.

It is still a further object of this invention to provide a positive vertical position control mechanism for a scanning electron beam in a color kinescope of the horizontal strip type.

According to the invention, scanning electron beam tracking in a color kinescope may be accomplished by causing at least one scanning electron beam to pursue an undulatory or wobble path across a target area, and by employing a means responsive to the impingement of the electron beam on the target area for developing a series of intermittent signals whose time spacing is a function of the deviation of the path of the electron beam from a preferred tracking path and by utilizing means responsive to the time spacing of the series of intermittent signals for tracking control.

In one form of the invention, a scanning electron beam is caused to pursue a nominally horizontal scanning path upon which is superimposed a vertically directed recurrent wobble across a target area consisting of selected elemental areas of electron-sensitive material so that the beam travels in an undulatory fashion. Information signals representative of selected aspects of a scene modulate the scanning electron beam whereby each of the selected elemental areas traverse during the composite scanning path is caused to be excited according to the information signal corresponding to the elemental area impinged. The scanning electron beam in its undulatory travel, also traverses and retraverses one or more indexing strips to provide a train of indexing signals whose characteristics are indicative of the alignment, i.e., the vertical position of the scanning path.

Means are additionally provided, in accordance with the present invention, for controlling the vertical position of the cathode ray beam in response to such indexing signals.

While the invention will be described herein in accordance with a specific embodiment in which the indexing elements comprise strips of ultraviolet light producing material, it will be understood that other arrangements may be employed; for example, an arrangement which includes strips of high secondary electron emission characteristics. It may also be noted that the invention may be used with a cathode ray tube which includes a plurality of electron beams, at least one of which is subjected to a vertically wobbling movement during deflection. Additionally, it is appreciated that the color elements may be of any suitable form other than different color light-emitting phosphors. For example, a line screen color filter may be used in conjunction with a phosphor screen composed of "white" light-emitting material.

Other and incidental objects of this invention will become apparent upon a reading of the following specification and a study of the drawings in which.

Figures 1, 2:
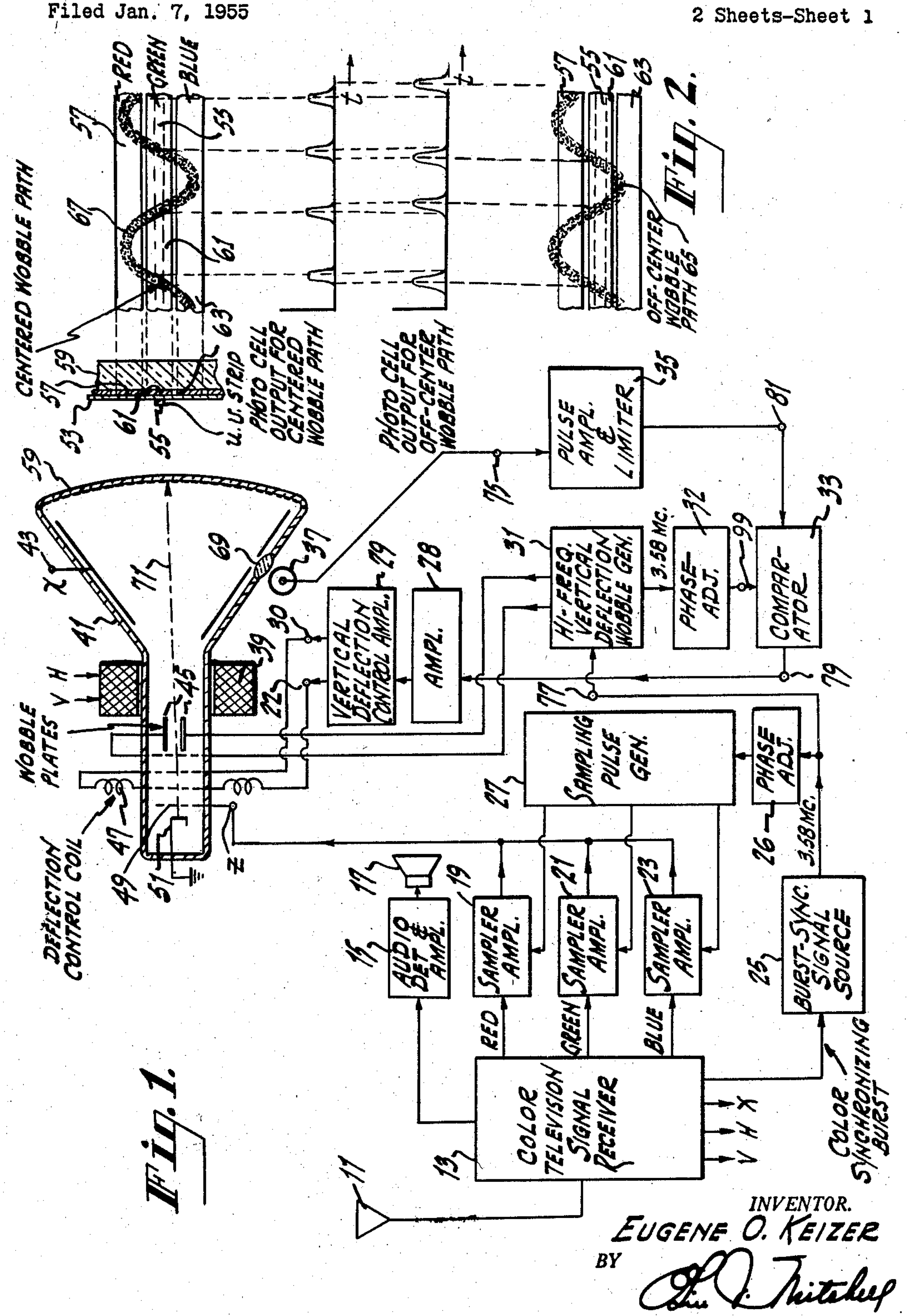
Figure 1 shows a block diagram of a color television receiver employing one illustrative form of the present invention.
Figure 2 shows graphically certain waveforms illustrative of indexing signals produced by the apparatus of Figure 1 for different selected conditions of operation.

Consider the color television circuit whose block diagram is shown in Figure 1. The incoming color television signal arrives at the antenna 11 and is applied to the color television signal receiver which does not specifically constitute a part of the present invention, and which may be of any type capable of producing signal demodulation in a manner whereby the component red, green and blue signals as originally produced in the television camera may be recovered. For a discussion of many of the aspects of color television signal receiver design, see for example, the paper entitled "Color Television Signal Receiver Demodulators" by Pritchard and Rhodes as published in the RCA Review in the June 1953 issue. The color television signal receiver also provides recovery of the sound information which is detected and amplified in the audio detector and amplifier 15 and impressed upon the loud speaker 17.

The color television signal receiver 13 in a conventional manner, also supplies suitable vertical and horizontal deflection signals to the deflection yoke 39 of the color kinescope 41, in addition to a high voltage to the ultor 43 and the separated color synchronizing "burst" to a burst synchronized signal source 25. The color synchronizing burst is a train of approximately eight cycles of a 3.58 megacycle signal having a prescribed phase relationship to the color information which is transmitted in the color television signal. This color synchronizing burst is transmitted on the "back porch" of each horizontal synchronizing pulse.

The output signal of the burst synchronized signal source 25 is used not only for the recovery of the color television signal information but also for the control of color signal sampling. As will appear later, the burst synchronized signal provided by the burst synchronized signal source 25 may also be employed for controlling the beam wobbulation in accordance with this invention.

The red, green and blue signals provided by the color television signal receiver 13 are applied respectively to the sampler amplifiers 19, 21 and 23 which are controlled by the sampling pulse generator 27. Sampling pulse generator 27 is in turn controlled by a signal provided by the burst sync signal source 25. The phase adjustor 26 is employed between the burst sync signal source 25 and the sampling pulse generator 27 for maintaining proper phase relationship between the sampling action provided in the sampler amplifiers 19, 21 and 23 as controlled by the sampling pulse generator 27 and the beam wobble, which will be seen to be controlled by the wobble plates 45 which are driven by the high frequency vertical deflection wobble generator 31; the high frequency vertical deflection generator 31 is controlled in frequency and in phase by the 3.58 megacycle signal provided by the burst sync signal source 25.

The outputs of the sampler amplifiers 19, 21 and 23 are coupled together and applied to the control grid 49 of the color kinescope 41. The function of the sampler amplifiers 19, 21 and 23 and the sampling pulse generators 27 is, for purposes which will become more fully apparent, that of converting the simultaneous red, green and blue representative video signals into a sequential form in which signals indicative of the several component colors appear successively at the control grid 49 in a predetermined order and at a predetermined rate.

On the image face or target screen 59 of the color kinescope 47 are horizontally disposed phosphor strips arrayed as shown in Figure 2 with the phosphor strips arranged in trios composed of the red phosphor strip 57, and a blue phosphor strip 63 separated by a green phosphor strip 61. The horizontally disposed phosphor strips are positioned so that they are substantially parallel to the path of the scanning electron beam 71. The path of the scanning electron beam in the particular embodiment shown in connection with Figures 1 and 2 is one wherein the scanning electron beam 71 undergoes vertical wobble as it scans generally horizontally along the face of the tube. One type of path which may be utilized to cause the scanning electron beam 71 to impinge sequentially on each of the color phosphor lines in a trio is the centered wobble path 67 shown in Figure 2 wherein it may be seen that the scanning electron beam 71, starting from the center, impinges first on the green phosphor strip 61; at one maximum excursion of the wobble it impinges on the red phosphor strip 57, returns again through the green phosphor strip 61 and during the maximum negative excursion passes through the blue phosphor strip 63, returning to the green phosphor strip 61 to complete the wobble cycle. During the time that this path wobble is taking place, color information is applied to the control electrode 49 of the color kinescope 41.

It is necessary that the color information reach the control grid 49 in proper sequential form so that the scanning electron beam 71 scans through, for example, the green phosphor strip 61 when green representative signal information is applied to the scanning electron beam 71.

There are several methods which may be utilized for impressing the color information in a sequential fashion on the control grid 49. One method is to sharp pulse sample the appropriate color information prior to its application to the control grid 49 so that a color representative signal of very short duration will be applied to the scanning electron beam 71 as it impinges on the corresponding color phosphor strip, Another method involves sinusoidal or "sine wave" sampling of the color information prior to its application to the control grid 49 so that a particular color representative signal will reach its maximum value at a time when the scanning electron beam is in registry with the corresponding color strip.

Since, in its wobble, the electron beam traverses the green color strip 61 twice during each wobble cycle, it may be desirable to equalize or balance the colors by applying a single pulse of green information to the control grid 49 as the scanning electron beam passes the green phosphor strip 61 and two successive pulses of red color information applied to the control grid 49 while the scanning electron beam impinges on the red phosphor strip 57. As the scanning electron beam 71 passes back over the green phosphor strip 61, a single pulse of green color information is applied to the control grid 49 and when the scanning electron beam passes over the blue phosphor strip 63, a pair of successive pulses of blue color representative information are impressed on the control grid 49.

The precise method of sequentially applying color information to the control grid 49 in synchronism with the position of the scanning electron beam 71 will be understood therefore as being a function of the design of the sampling pulse generator 27. The rate and frequency of sampling provided by the particular embodiment shown in Figure 1 is adjusted for information at 3.58 megacycles utilizing a signal which is obtained from the burst sync signal source 25. The phase adjustor 26 is used to adjust the phase of the signal. The frequency which has been utilized for the vertical wobble path of the scanning electron beam in the manner shown in Figure 2 was chosen as a matter of convenience to be 3.58 megacycles; it is important to note that the frequency 7.12 megacycles could also have been used with the objective of reducing visual indication of dot and line structure. The 3.58 megacycle signal provided by the burst sync signal source 25 is applied to the terminal 77 from which terminal it is impressed upon the high frequency vertical deflection wobble generator 31 which in turn applies the wobble deflection signal to the wobble deflection plates 45. The signal applied to the wobble deflection plates 45 may be a sinusoidal wave or may be a wave of any suitable amplitude having the correct frequency and waveform which yields the desired wobble or undulatory path of the scanning electron beam 71.

As has been pointed out briefly in systems of the type shown in Figure 1, it is necessary that means be provided for insuring that the scanning electron beam is forced to travel along a desired path. In the particular embodiment shown in Figure 2, an ultraviolet light emitting indexing strip 55 is aligned centrally along each green phosphor strip. This ultraviolet light emitting strip 55 is sensitive to the scanning electron beam in that when the electron beam passes over the ultraviolet light emitting strip 55, a pulse will be produced by the photosensitive device 37 which is responsive to ultraviolet light. The pulses constituting the output of the photosensitive device 37 for the case of a centered wobble path are shown in Figure 2. These pulses occur at a rate twice the frequency of beam wobble.

For the condition when the wobble path is off center, such as depicted by the path 65, the photocell output produces a different set of pulses from those indicated by the photocell output for the case of a centered wobble path.

The pulses provided by the photosensitive device 37 are applied to the pulse amplifier and limiter which amplifies the pulses and limits their amplitude in such manner that the output of the pulse amplifier and limiter 35 is caused to be substantially independent of the precise amount of ultraviolet light furnished to the photosensitive device by the ultraviolet light emitting index strip 55. The amplitude limited pulses provided by the pulse amplifier and limiter 35 are then applied to a comparator 33 which is also provided with a 3.58 mc. signal of proper phase from the high frequency vertical deflection wobble generator 31 by way of the phase adjustor 32. By utilizing an appropriate frequency and phase discriminator or comparator circuit 33, one of which will be described in the specifications, a control signal is made available at terminal 79; this control signal is indicative of the extent of off center drift of the scanning electron beam path. This control signal which is available at terminal 79 is amplified in the amplifier 28 and applied to the vertical deflection control amplifier 29 which passes a current through the deflection control coil 47. This current is of such magnitude and direction as to cause a scanning electron beam to return to the condition wherein it traverses a centered wobble path.

Consider now the basic concepts which contribute to the operation of the present invention. As is seen in Figure 2, when the wobble path is centered with respect to the ultraviolet light emitting index strip, then the photosensitive device 37 yields a series of equally spaced pulses having a fundamental frequency of 7.12 megacycles per second, as compared to the 3.58 megacycles per second which constitutes the frequency of the wobble. This fundamental frequency is due to the fact that a pulse is produced every half cycle of the wobble at the time of the crossing of the ultra-violet light emitting index strip 55 by the scanning electron beam 71. If a signal having a frequency of 7.12 megacycles per second is applied from the pulse amplifier and limiter 35 to the comparator 33 at the same time that a 3.58 megacycle signal is applied thereto via the phase adjustor 32, then for normal operation of the comparator 33 the output of the comparator will be zero.

When the wobble path drifts off center as shown by path 65, the scanning electron beam 71 will excite the ultraviolet light emitting index strip 55 during different portions of the wobble path, producing for example, a corresponding photo cell output as illustrated in Figure 2. As the beam traverses a wobble path, the disposition of the pulses as a function of time, will be such that a 3.58 megacycle component will be produced having an amplitude and phase dependent upon the direction and degree by which the wobble path is off center. In extreme cases, such as, for example, when the wobble path strays sufficiently off center so that only a "positive" or "negative" peak excursion of the scanning path touches the ultraviolet light emitting index strip 55, only a single pulse will be produced during each cycle of the 3.58 megacycle wobble representing substantially a maximum value of a 3.58 megacycle component yielded by the pulses which are furnished by the photosensitive device 37 which may be a photocell. However, as the wobble path moves off center one direction or another, then as has been mentioned, the 3.58 megacycle component of the signal indicated by the photosensitive device 37 will not only increase in amplitude, but also its phase will change. This phase will be a function of the time spacing or time intervals between the pulses which are produced by the photosensitive device 37 in response to ultraviolet light emitted by the ultraviolet light index strip 55.

As explained, the phase of the signal frequencies at 3.58 megacycles produced by the wobbled beam intercepting the ultraviolet light emitting index strip 55 is compared with a 3.58 megacycle signal which is delivered through the phase adjustor 32 to the comparator 33 by the high frequency vertical deflection wobble generator 31 to provide a control signal which is proportional to the spacing between pulses or to the phase of the 3.58 megacycle signal which is derived from these pulses; the comparator 33 thereupon provides a control signal which is proportional to the degree of alignment of the wobble path.

Figure 3:
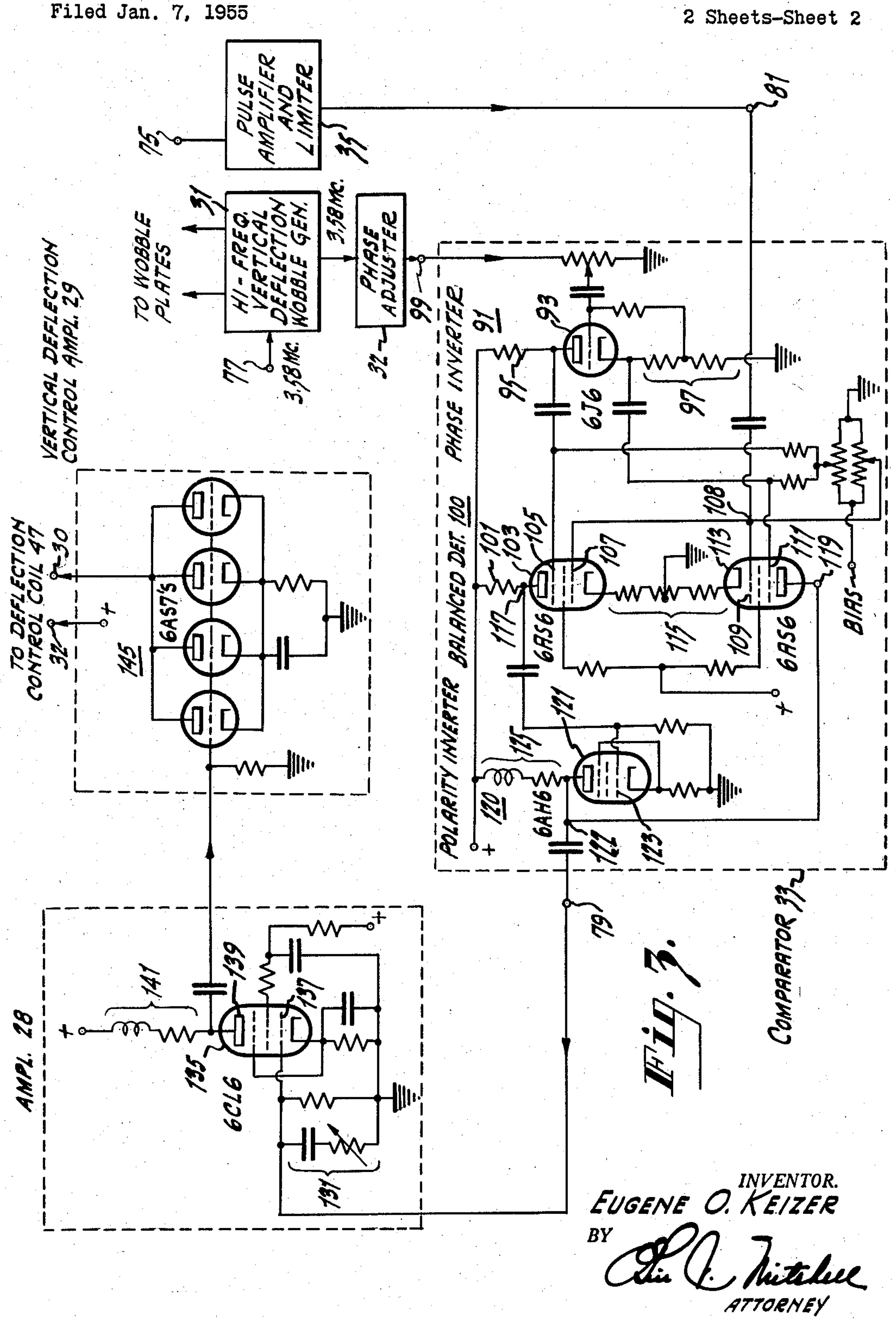
Figure 3 shows a circuit diagram of one type of comparator and vertical deflection control amplifier circuit which may be utilized in practicing the present invention.

A schematic diagram of an operative circuit capable of performing the functions taught by the present invention is shown in Figure 3 wherein it is seen that the high frequency vertical deflection wobble generator 31 passes a 3.58 megacycle signal through the phase inverter 32 to the terminal 99 of the comparator 33. At the same time, the pulse amplifier and limiter 35 presents amplitude limited or clipped pulses to the input terminal 81 of the comparator 33. The output of the comparator 33 is amplified in the amplifier 28 and used to control the vertical deflection amplifier 29 which, in turn, presents a compensating beam-scan-error correcting signal to the auxiliary deflection coil 47 to deflect the beam vertically to its proper position.

The comparator 33, which is illustrated in Figure 3, performs operationally in the following manner. The 3.58 megacycle signal derived from the high frequency vertical deflection wobble generator 31 and the phase adjustor 32 is applied to the phase inverter 91 whose output which is developed across resistors 95 and 97, is then applied, respectively, to the grids 105 and 111 of the electron tubes 103 and 113. The amplitude limited pulses applied to the input terminal 81 are applied simultaneously to the control grids 107 and 109 of the tubes 103 and 113, respectively. The tubes 103 and 113 and their respective circuits constitute a balanced detector 100 which functions as a balanced modulator. The output of the tube 103 which constitutes a signal developed across the resistor 101 is then passed through the polarity inverter 120 to the plate terminal 122 to which is also applied the signal from the tube 103; the latter mentioned signal is applied to the control grid 123 of tube 121 by way of terminal 117 of the resistor 101. Utilizing the common output load 125 which contains means for affording high frequency compensation, a comparator signal is furnished at the output terminal 79; this comparator signal is representative of the frequency and phase difference between the 3.58 megacycle signal delivered by the phase adjustor 32 and the fundamental 3.58 megacycle signal component of the amplitude limited pulses supplied by the pulse amplifier and limiter 35. The comparator signal produced at the output terminal 79 is then applied to the control grid 137 of the tube 135 of amplifier 28 where it is caused to be amplified and therefrom produced across the output circuit 141 by way of anode 139. It is to be noted that the overall circuit which includes the scanning electron beam 71 in the color kinescope 59, the deflection control coil 47, the wobble plates 45, the balanced detector 100, the high frequency vertical deflection wobble generator 31, the amplifier 28 and the vertical deflection control amplifier 29 constitute in part a feedback circuit, which without proper control may be caused to develop oscillations which would detract from the operation of the present invention. There is therefore included in the amplifier 28 an adjustable series resistance-capacitance circuit 131 which is adjusted to provide proper characteristics of the total control loop or servo path so that the system will not break into oscillation thereby providing that the overall servo control of the centering of the wobble path be accomplished in an optimum fashion.

The output signal of the amplifier 28 is applied to the vertical deflection control amplifier 29 which, in the embodiment shown in Figure 3, is made up of a group of triodes 145, all connected in parallel. This group of triodes constitutes a tube group 145 suitable for passing a large current through the deflection coil 47 to produce the desired control of the centering of the wobble path.

One aspect of the system described is concerned with the nature of the output signal of the comparator 33 during scanning retrace time. It is important that false or inaccurate signals not be applied to the deflection coil 47 to prevent the wobble path from being properly aligned with a particular phosphor line group at the start of each scanning line. This improper alignment may be prevented by utilizing one of several methods; one method restricts the maximum excursion of the wobble path by restricting the magnitude of the control voltage provided by the comparator 33 and the current furnished by the vertical deflection control amplifier 29 to the deflection control coil 47. Another method involves the biasing off of the pulse amplifier and limiter 35 during the horizontal and vertical retrace interval; yet another method renders a photoelectric cell 37 inoperative during the horizontal and vertical retrace intervals.

Having described the invention, what is claimed is:

1. A cathode ray beam registration system for use with a color image reproducer having at least one scanning electron beam and a target area consisting of selected elemental areas of electron-sensitive material and selected areas of electron-sensitive indexing material comprising: means for deflecting the scanning electron beam along a scanning path across the target area, said scanning path consisting of a scanning path having a first prescribed direction upon which is superimposed a periodic recurrent wobble having a second prescribed direction, means for supplying color information signals to modulate the current intensity of the scanning electron beam, means for causing each of said elemental areas scanned by the cathode ray beam to be excited according to the color information signal corresponding to the elemental area impinged, means for causing the cathode ray beam to traverse and excite said prescribed selected areas of electron-sensitive indexing material at least twice during each period of said recurrent wobble to produce a train of pulses having spacings indicative of the alignment of said scanning path with respect to said selected elemental areas of electron-sensitive material, beam deflection control means responsive to the characteristics of said train of signals for producing a deflection control voltage, and means to alter the position of the cathode ray beam in a vertical direction by the deflection control voltage whereby said scanning path is maintained in a prescribed alignment.

2. A cathode ray beam registration system for use with a color image reproducer having a plurality of scanning electron beams and a target area consisting of selected elemental areas of electron-sensitive material and selected areas of electron-sensitive indexing material, comprising: means for deflecting at least one of the scanning electron beams along a path across the target area, said path consisting of a first path having a first prescribed direction upon which is superimposed a recurrent wobble having a second prescribed direction, means for supplying information signals to modulate the current intensity of selected electron beams of said plurality of electron beams, means for causing the scanning electron beam pursuing the wobble path to excite each successive elemental area traversed in the path of said recurrent wobble with current intensity according to corresponding information and to traverse said prescribed selected areas of electron-sensitive indexing material to produce a train of pulses having spacings indicative of the alignment of said scanning path with respect to said selected elemental areas of electron-sensitive material, beam deflection control means responsive to the characteristics of said train of signals for producing a deflection control voltage, and means to alter the position of said plurality of scanning electron beams in a direction normal to said first scanning path by the deflection control voltage whereby said scanning path is maintained in a prescribed alignment.

3. A cathode ray beam registration system for use with a color image reproducer having at least one scanning electron beam and a target area consisting of horizontal strips of electron-sensitive material having prescribed color light emitting characteristics, and strips of electron-sensitive indexing material, each of said strips of electron-sensitive indexing material arrayed in a prescribed alignment with a predetermined group of said strips of electron-sensitive material having prescribed color light emitting characteristics, comprising: means for deflecting the scanning electron beam along a composite scanning path across the target area consisting of a horizontal scanning path upon which is superimposed a vertically directed recurrent wobble, means for supplying color information signals to modulate the current intensity of the scanning electron beam at a prescribed sequence and rate, means for causing each of said color light emitting strips traversed by the scanning electron beam to be excited according to the information signal corresponding to the strip impinged, means for causing the scanning electron beam to traverse each strip of electron-sensitive indexing material to produce a train of pulses whose spacing between pulses is indicative of the alignment of said composite scanning path with respect to the group of color light emitting strips which is associated with that strip of electron-sensitive indexing material, beam deflection control means responsive to the spacing of said pulses for producing a deflection control voltage, and means to alter the position of the scanning electron beam in a vertical direction by the deflection control voltage whereby said composite scanning path is maintained in a prescribed alignment.

4. A cathode ray beam registration system for use with a color image reproducer having a scanning electron beam modulated by color information at a prescribed sequence and rate and a target area including groups of selected segements of cathode luminescent material, the combination of: means for deflecting said scanning electron beam over a path having a predetermined recurring vertically varying waveform during each scanning line path interval and traversing a prescribed group of said selected segments and wherein at least one of said selected segments is subjected to color information indicating electron bombardment more than once during a cycle of said predetermined waveform, said predetermined waveform having a prescribed frequency; electron beam sensitive emitting means incorporated with said group of selected segments of cathode luminescent material and bearing prescribed positioning arrangement therewith, detection means responsive to said scanning electron beam impinging on said electron beam sensitive emitting means to develop an output signal indicative of the alignment of the scanning path of said scanning electron beam relative to the group of said selected segments, a signal comparator means utilized for comparing the output signal of said detection means and the fundamental signal frequency of said predetermined waveform to develop a reference signal which is indicative of said alignment of said scanning path which said scanning electron beam pursues during a scanning line interval, and scanning beam tracking alignment control means responsive to said reference signal for control of the tracking alignment of said scanning electron beam.

5. A scanning electron beam registration system for use with a color image reproducer having a scanning electron beam and a target area including horizontally arrayed strips of selected segments of cathode luminescent color light emitting material, a source of received component color signals, means for actuating said scanning electron beam over a path having a predetermined recurring vertically directed waveform for each scanning path line interval and traversing a prescribed group of said horizontally arrayed strips of cathode luminescent material and wherein one or more of said strips is subjected to electron bombardment by said scanning electron beam more than once during a cycle of said predetermined waveform, electron beam sensitive emitting means incorporated with each prescribed group of said horizontally arrayed strips and bearing prescribed positioning arrangements therewith, detection means responsive to said scanning electron beam impinging on said electron beam sensitive emitting means to produce an output signal which is indicative of the vertical positioning of the scanning path of said scanning electron beam relative to the prescribed group of horizontally arrayed strips being traversed, a signal comparator means utilized for comparing said output signal in the fundamental signal frequency of said predetermined waveform to develop a reference signal which is indicative of the positioning of said scanning path, scanning path vertical positioning control means responsive to said reference signal for control of the vertical positioning of said scanning electron beam, sampling and synchronizing means coupled to said source of component color signals and including apparatus for deriving a sequence of component color signals with said sequence synchronized in accordance with the color of light emitted by the electron bombardment of each of said segments of said strips of cathode luminescent material which are traversed by said scanning electron beam, and means for employing said sequence of component color signals for modulating the intensity of said scanning electron beam.

References Cited in the file of this patent

UNITED STATES PATENTS

| | | |
|---|---|---|
| 2,671,129 | Moore | Mar. 2, 1954 |
| 2,674,651 | Creamer | Apr. 6, 1954 |
| 2,677,723 | McCoy | May 4, 1954 |
| 2,763,715 | Fromm | Sept. 18, 1956 |
| 2,773,118 | Moore | Dec. 4, 1956 |